United States Patent
Wang et al.

(10) Patent No.: US 10,288,939 B2
(45) Date of Patent: May 14, 2019

(54) BACKLIGHT AND MANUFACTURING METHOD THEREOF, LIGHT GUIDE PLATE AND MANUFACTURING METHOD THEREOF, AND DISPLAY DEVICE

(71) Applicants: BOE TECHNOLOGY GROUP CO., LTD., Beijing (CN); BEIJING BOE DISPLAY TECHNOLOGY CO., LTD., Beijing (CN)

(72) Inventors: Huijuan Wang, Beijing (CN); Xue Dong, Beijing (CN); Yonglian Qi, Beijing (CN); Fei Wang, Beijing (CN); Zhenhua Lv, Beijing (CN); Hongshu Zhang, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/745,043
(22) PCT Filed: Aug. 2, 2017
(86) PCT No.: PCT/CN2017/095586
§ 371 (c)(1),
(2) Date: Jan. 15, 2018
(87) PCT Pub. No.: WO2018/129909
PCT Pub. Date: Jul. 19, 2018

(65) Prior Publication Data
US 2019/0011780 A1    Jan. 10, 2019

(30) Foreign Application Priority Data
Jan. 12, 2017    (CN) .......................... 2017 1 0021787

(51) Int. Cl.
*F21V 8/00*    (2006.01)
*G02F 1/1335*    (2006.01)
(52) U.S. Cl.
CPC ....... *G02F 1/133603* (2013.01); *G02B 6/004* (2013.01); *G02B 6/0031* (2013.01);
(Continued)

(58) Field of Classification Search
CPC .............. G02F 1/133602–133611; G02B 6/0035–0043; G02B 6/0011–0021; G02B 6/005–0055
See application file for complete search history.

(56) References Cited

U.S. PATENT DOCUMENTS 8,044,570 B2 * 10/2011 Oyaizu ................... F21V 31/04
                                                            313/501
9,146,419 B1 * 9/2015 Anandan .............. G02B 6/0035
(Continued)

FOREIGN PATENT DOCUMENTS

CN    104154468 A    11/2014
CN    104819404 A    8/2015
(Continued)

OTHER PUBLICATIONS

International Search Report & Written Opinion dated Nov. 22, 2017, regarding PCT/CN2017/095586.

*Primary Examiner* — Mariceli Santiago
(74) *Attorney, Agent, or Firm* — Intellectual Valley Law, P.C.

(57) ABSTRACT

The present disclosure discloses a backlight and a manufacturing method thereof, a light guide plate and a manufacturing method thereof and a display device. The backlight is a direct type backlight, and the backlight includes: a light guide plate having a main body of a plate shape, a plurality of light emitting units that are placed toward to a plane side of the light guide plate; where the light guide plate comprises a Quantum Dot (QD) layer on a first surface of the main body wherein the first surface is substantially flat.

17 Claims, 6 Drawing Sheets

(52) U.S. Cl.
CPC .. *G02F 1/133605* (2013.01); *G02F 1/133621* (2013.01); *G02B 6/0026* (2013.01); *G02F 2202/36* (2013.01)

(56) References Cited

U.S. PATENT DOCUMENTS

| | | | |
|---|---|---|---|
| 2011/0176328 A1* | 7/2011 | Anandan | G02B 6/0036 362/606 |
| 2015/0187987 A1 | 7/2015 | Sim et al. | |
| 2015/0219936 A1 | 8/2015 | Kim et al. | |
| 2016/0091640 A1 | 3/2016 | Wu et al. | |
| 2017/0168217 A1 | 6/2017 | Li et al. | |
| 2017/0168351 A1 | 6/2017 | Qiu et al. | |
| 2017/0199314 A1* | 7/2017 | Chen | B29C 47/00 |
| 2017/0254943 A1* | 9/2017 | Murphy | G02B 6/005 |

FOREIGN PATENT DOCUMENTS

| | | |
|---|---|---|
| CN | 105319773 A | 2/2016 |
| CN | 105388666 A | 3/2016 |
| CN | 205388672 U | 7/2016 |
| WO | WO-2018048841 A1 * | 3/2018 |

* cited by examiner

BACKLIGHT AND MANUFACTURING METHOD THEREOF, LIGHT GUIDE PLATE AND MANUFACTURING METHOD THEREOF, AND DISPLAY DEVICE

CROSS-REFERENCE TO RELATED APPLICATION

This patent application is a national stage application under 35 U.S.C. § 371 of International Application No. PCT/CN2017/095586, filed Aug. 2, 2017, which claims the priority of the Chinese Patent Application No. 201710021787.3 filed on Jan. 12, 2017, the entire contents of which are hereby incorporated by reference herein in its entirety.

TECHNICAL FIELD

The present disclosure relates to the technical field of displaying, and particularly relates to a backlight and a manufacturing method thereof, a light guide plate and a manufacturing method thereof, and a display device.

BACKGROUND

A backlight is a light source mounted on a back of a Liquid Crystal Display (LCD). A direct type backlight typically includes a light guide plate and a plurality of light-emitting diodes (LEDs) positioned on a first surface of the light guide plate and arranged in a matrix. The light emitted by the LEDs is transmitted through the light guide plate.

In order for making light emitted by a direct type backlight an uniform light, light emitting sides of LEDs may be formed with a certain distance from a light guide plate when the LEDs are placed. Such distance may ensure that light emitted by adjacent LEDs may be mixed to preliminarily homogenize the light before the light enters the light guide plate, and the optical quality of the backlight may be ensured.

As such, for a direct type backlight, it is necessary to allow a certain distance between an LED and a light guide plate. Because of that, the structure of the backlight is limited by the distance between a light emitting unit (e.g., a LED) and the light guide plate. Thus, the ability to flexibly adjust the backlight is relatively lower.

SUMMARY

Embodiments of the present disclosure provide a backlight and a manufacturing method thereof a light guide plate and a manufacturing method thereof and a display device.

In a first aspect, the present disclosure provides a backlight which is a direct type backlight. The backlight may include: a light guide plate having a main body of a plate shape; a plurality of light emitting units that are placed toward to a plane side of the light guide plate; where the light guide plate comprises a Quantum Dot (QD) layer on a first surface of the main body wherein the first surface is substantially flat.

Optionally, the QD layer may include a plurality of QD blocks, an orthographic projection of each of the plurality of QD blocks on the surface is overlapped with an orthographic projection of at least one of the plurality of light emitting units on the first surface.

Optionally, the light guide plate may include a plurality of cavities on the first surface, and each of the plurality of cavities contains one of the plurality of QD blocks.

Optionally, the light guide plate further may include a plurality of reflectors on a second surface of the main body having a one-to-one relationship with the plurality of QD blocks, where the second surface is substantially flat, and an orthographic projection of each of the plurality of reflectors on the first surface may cover an orthographic projection of a corresponding QD block on the first surface, and a reflecting surface of each of the plurality of reflectors may face a corresponding QD block.

Optionally, the backlight may further include an optical film layer on a side of the light guide plate that is placed away from the plurality of light emitting units; and coupling structures on a side of the optical film layer that are away from the light guide plate; a transparent adhesive layer between the optical film layer and the light guide plate; and a refractive index t0 of the transparent adhesive is larger than a refractive index t1 of the light guide plate, and smaller than a second refractive index t2 of the optical film layer.

Optionally, the light guide plate further may include: coupling structures arranged on one of the first surface and the second flat surface.

Optionally, the coupling structures may be lattice point structures, grating structures, micro-lens structures or micro-prism structures.

Optionally, the backlight further may include: a substrate, and where the plurality of light emitting units are fixed on a surface of the substrate, and wherein each of the plurality of light emitting units has a light emitting surface that is attached onto the first surface of the light guide plate.

Optionally, the substrate is a transparent substrate, and a reflecting layer is arranged on a second surface of the substrate.

Optionally, the light emitting units are micro light emitting chips, and the plurality of light emitting units are bonded onto the first surface of the main body.

Optionally, a reflecting layer covering the first surface except where the light emitting units are positioned.

Optionally, the light emitting units are blue Light-Emitting Diodes (LEDs).

Optionally, the plurality of QD blocks are made from a QD material which comprises a base material, a ligand material and scattering particles; and the base material comprises Polyetherimide (PEI) and Ammonium Persulfate (APS), the ligand material comprises an epoxy resin, and the scattering particles comprise silicon dioxide particles.

In a second aspect, the present disclosure provides a light guide plate. The light guide plate may include: a main body of plate shape, a plurality of cavities on a first surface of the main body, and a plurality of Quantum Dot (QD) blocks on the main body, where each of the plurality of cavities contains one of the plurality of QD blocks.

Optionally, the light guide plate further includes: a plurality of reflectors arranged on a light emitting surface of the light guide plate body, wherein and a one-to-one correspondence exists between the plurality of QD blocks and the plurality of reflectors, an orthographic projection of each of the plurality of reflectors on the first surface of the light guide plate covers an orthographic projection of a corresponding QD block on the first surface of the light guide plate, and a reflecting surface of each of the plurality of reflectors faces a corresponding QD block.

Optionally, the light guide plate further includes: grating structures arranged on one of the plurality of surfaces of the light guide plate body.

Optionally, the QD blocks are made from a QD material which comprises a base material, a ligand material and scattering particles; and the base material comprises Polyetherimide (PEI) and Ammonium Persulfate (APS), the ligand material comprises an epoxy resin, and the scattering particles comprise silicon dioxide particles.

Optionally, a packaging adhesive layer on the plurality of QD blocks.

On a third aspect, the present disclosure provides a method for manufacturing a light guide plate. The method may include: providing a main body of plate shape having a main body of plate shape; and forming a plurality of light emitting units toward to a plane side of the light guide plate, wherein the light guide plate comprises a Quantum Dot (QD) layer on a first surface of the main body wherein the first surface is substantially flat.

In a fourth aspect, the present disclosure provides a display device. The display device may include any of the backlights described above.

It is to be understood that both the foregoing general description and the following detailed description are exemplary only and are not restrictive of the present disclosure.

BRIEF DESCRIPTION OF THE DRAWINGS

FIG. 1-1 is a schematic view of a structure of a backlight according to an embodiment of the present disclosure;

FIG. 1-2 is a schematic view of a structure of another backlight according to an embodiment of the present disclosure;

FIG. 1-3 is a schematic view of a structure of yet another backlight according to an embodiment of the present disclosure;

FIG. 1-4 is a schematic view of a structure of still yet another backlight according to an embodiment of the present disclosure;

FIG. 1-5 is a schematic view of a structure of a backlight according to another embodiment of the present disclosure:

FIG. 1-6 is a schematic view of a structure of another backlight according to another embodiment of the present disclosure:

FIG. 1-7 is a schematic view of a structure of yet another backlight according to another embodiment of the present disclosure;

FIG. 1-8 is a schematic view of a structure of still yet another backlight according to another embodiment of the present disclosure;

FIG. 1-9 is a schematic view of a structure of still yet another backlight according to another embodiment of the present disclosure;

FIG. 1-10 is a schematic diagram of light transmission of a backlight shown in FIG. 1-8;

FIG. 2-1 is a schematic view of a structure of a light guide plate according to an embodiment of the present disclosure;

FIG. 2-2 is a schematic view of a structure of another light guide plate according to an embodiment of the present disclosure;

FIG. 2-3 is a schematic view of a structure of yet another light guide plate according to an embodiment of the present disclosure;

FIG. 2-4 is a schematic view of a structure of still yet another light guide plate according to an embodiment of the present disclosure;

FIG. 2-5 is a schematic view of a structure of still yet another light guide plate according to an embodiment of the present disclosure;

FIG. 2-6 is a schematic view of a structure of a light guide plate according to another embodiment of the present disclosure:

FIG. 3-1 is a flowchart of a method for manufacturing a backlight according to an embodiment of the present disclosure;

FIG. 3-2 is a flowchart of a method for manufacturing a light guide plate according to an embodiment of the present disclosure.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various examples of the present disclosure. Also, common but well-understood elements that are useful or necessary in a commercially feasible example are often not depicted in order to facilitate a less obstructed view of these various examples. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above, except where different specific meanings have otherwise been set forth herein.

DETAILED DESCRIPTION

Embodiments of the present disclosure will be further described below in detail with reference to the drawings.

The terminology used in the present disclosure is for the purpose of describing exemplary examples only and is not intended to limit the present disclosure. As used in the present disclosure and the appended claims, the singular forms "a," "an" and "the" are intended to include the plural forms as well, unless the context clearly indicates otherwise. It shall also be understood that the terms "or" and "and/or" used herein are intended to signify and include any or all possible combinations of one or more of the associated listed items, unless the context clearly indicates otherwise.

It shall be understood that, although the terms "first," "second," "third," etc. may be used herein to describe various information, the information should not be limited by these terms. These terms are only used to distinguish one category of information from another. For example, without departing from the scope of the present disclosure, first information may be termed as second information and similarly, second information may also be termed as first information. As used herein, the term "if" may be understood to mean "when" or "upon" or "in response to" depending on the context.

Reference throughout this specification to "one embodiment," "an embodiment," "exemplary embodiment." or the like in the singular or plural means that one or more particular features, structures, or characteristics described in connection with an example is included in at least one embodiment of the present disclosure. Thus, the appearances of the phrases "in one embodiment" or "in an embodiment," "in an exemplary embodiment," or the like in the singular or plural in various places throughout this specification are not necessarily all referring to the same embodiment. Furthermore, the particular features, structures, or characteristics in one or more embodiments may be combined in any suitable manner.

Figure 11:
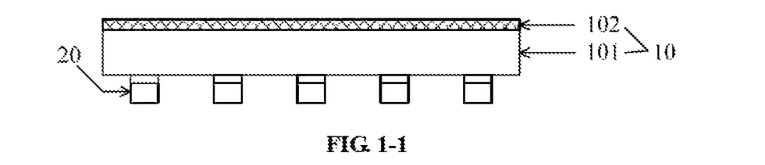

An embodiment of the present disclosure provides a backlight. As shown in FIG. 1-1, the backlight is a direct type backlight. The backlight may include a light guide plate 10 and a plurality of light emitting units 20 arranged on a first surface of the light guide plate 10. A surface of the light guide plate 10 being close to the plurality of light emitting units 20 may be named as a light-entering surface. Another surface of the light guide plate 10 being farther away from the plurality of light emitting units 20 may be named as a light-emitting surface. Sometimes, the light-entering surface may be considered a first surface, and the light-emitting surface may be a second surface.

Optionally, light emitting surfaces of the light emitting units 20 may be attached onto the first surface of the light guide plate 10.

The light guide plate 10 may include: a main body 101 of plate shape and a Quantum Dot (QD) layer 102 arranged on the light guide plate body 101. On the light guide plate, a plurality of light emitting units may be placed toward to a plane side of the light guide plate. The light guide play may include the QD layer that is placed on a first surface of the main body 101. The first surface is substantially flat.

Optionally, as shown in FIG. 1-1, the QD layer may have a whole-layer structure. The QD layer may be positioned on the first surface side of the light guide plate 10, or the light emitting surface side of the light guide plate 10. The QD layer may also be positioned on other places that are associated with the light guide plate 10. The light guide plate 10 may be made from an organic material or glass. The light guide plate 10 may also be made from other materials.

It shall be noted that light having a first wavelength emitted by the plurality of light emitting units 20 is capable of illuminating the QD layer 102 to emit light having a second wavelength.

From the above, according to the backlight provided by the embodiment of the present disclosure, the backlight is of direct type. The backlight may include the light guide plate 10 and the plurality of light emitting units 20 arranged on the first surface of the light guide plate 10.

The QD layer 102 may be arranged on the light guide plate, and may be triggered by the light emitting units 20 to emit light in a scattering manner to achieve a light uniformization effect. Therefore, the light emitting sides of the light emitting units 20 are not required to be formed with a certain distance from the first surface of the light guide plate 10 for light mixing. For example, the light emitting units 20 may be attached onto the first surface of the light guide plate 10. Thus, the structure of the backlight may be prevented from being limited by the distance between the light emitting units 20 and the light guide plate 10 to achieve the light uniformization. The flexibility of adjusting the backlight is improved.

Sometimes, the light emitting units may be Light-Emitting Diodes (LEDs). The LEDs may be blue Light-Emitting Diodes. In order to preliminarily uniformize light emitted by LEDs, the LEDs 20 may be required to be kept at a certain distance away from the light guide plate 10, and the certain distance is required to ensure that the light emitted by adjacent LEDs may be mixed.

In the embodiment of the present disclosure, a thickness in micron size of the QD layer may be far smaller than the certain distance. The backlight is provided with the QD layer, and the structure of the backlight may help to decrease the distance between the light emitting units and the light guide plate and reduce an overall thickness of the backlight. The light emitting units and the light guide plate may form a gap or may be integrally attached with each other.

If the QD layer has the whole-layer structure, the overall thickness of the backlight is reduced because total thickness obtained by adding the distance between the light emitting units and the light guide plate and the thickness of the QD layer is smaller than the certain distance. If light emitting surfaces of the light emitting units are attached onto the light guide plate, that is, the distance there between is 0, the thickness of the QD layer may almost be neglected relative to the overall thickness of the backlight. Thus, the overall thickness of the backlight may be further reduced, and lightness and thinness of the backlight can be improved.

Figure 12:
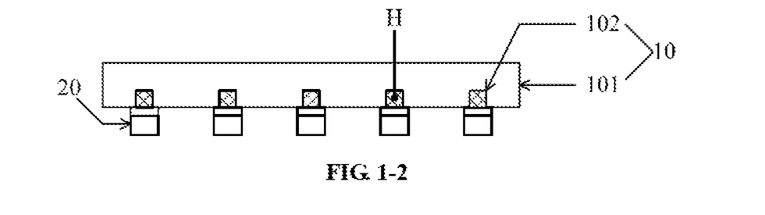

Optionally, as shown in FIG. 1-2, the QD layer 102 may include a plurality of QD blocks. There are one-to-one correspondences between the plurality of QD blocks and the plurality of light emitting units 20. An orthographic projection of each of the plurality of QD blocks on the first surface of the light guide plate 10 is overlapped with an orthographic projection of a corresponding light emitting unit 20 on the first surface of the light guide plate 10. Compared with the backlight shown in FIG. 1-1, the backlight shown in FIG. 1-2 may save the QD material and may lead to the reduction of the production cost.

The orthographic projections of the QD blocks on the first surface of the light guide plate and the orthographic projections of the light emitting units on the first surface of the light guide plate are overlapped and correspond with one to one. The light emitted by the light emitting units may trigger the QD blocks to emit light in the scattering manner to achieve the light uniformization or light homogenization effect.

It shall be noted that, when the orthographic projections of the QD blocks on the first surface of the light guide plate are overlapped with the orthographic projections of the light emitting units on the first surface of the light guide plate, the orthographic projections of the QD blocks on the first surface of the light guide plate may cover the orthographic projections of the light emitting units on the first surface of the light guide plate. Alternatively, the orthographic projections of the light emitting units on the first surface of the light guide plate may cover the orthographic projections of the QD blocks on the first surface of the light guide plate. Sometimes, the orthographic projections of the QD blocks on the first surface of the light guide plate may be completely overlapped with the orthographic projections of the light emitting units on the first surface of the light guide plate. In certain situations, the orthographic projections of the QD blocks on the first surface of the light guide plate may be partially overlapped with the orthographic projections of the light emitting units on the first surface of the light guide plate. Other situations between the two may be arranged and will not be elaborated herein but should be still in the scope of the present disclosure.

Optionally, as shown in FIG. 1-2, a plurality of cavities H may be formed in the surface of the light guide plate body 101, and a QD block may be arranged to place in each of the plurality of cavities H. The plurality of cavities H may be formed in a surface of the light guide plate body 101 in a format of an array.

Figure 13:
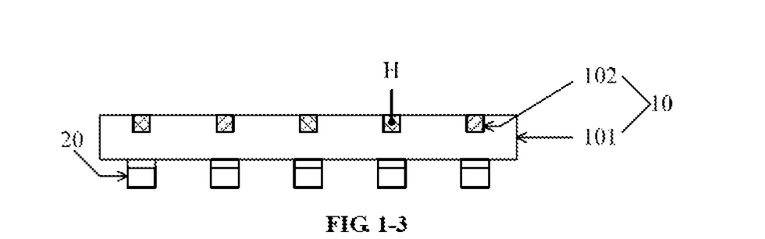

Optionally, as shown in FIG. 1-2, the plurality of cavities H arranged in the array may be formed in the first surface of the light guide plate 10. Alternative, as shown in FIG. 1-3, the plurality of cavities H formed in the array may be formed in the second surface of the light guide plate. Thus, the QD blocks may be arranged in the light guide plate body, and the thickness of the backlight may be reduced.

Optionally, a packaging adhesive may be applied on the surfaces of the QD blocks. For example, an integrated packaging adhesive layer may be developed on the surface, in which the cavities are formed, of the light guide plate body. Alternatively, a layer of packaging adhesive may be coated on the surface of each of the plurality of QD blocks in the cavities to seal the QD block. Thus, sealing the QD blocks may avoid the QD material from being corroded by water oxygen and light emitting reliability of the QD material can be improved and the stability of the light guide plate can thereby be improved.

In other implementation, as shown in FIG. 1-1, an edge of the QD layer in the backlight shown in FIG. 1-1 may be easily corroded by the water oxygen in the air. As such, a failure of the QD material on the edge may occur and may affect the light emitting quality of the backlight to a certain extent.

In the embodiment of the present disclosure, the QD blocks in the backlight shown in FIGS. 1-2 and 1-3 are well sealed, so that the problem of failure of the edge can be solved.

Figure 14:
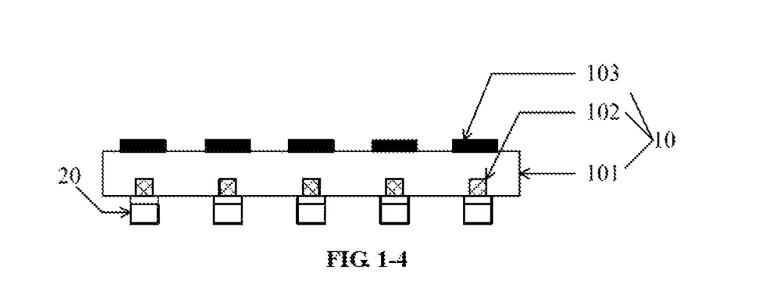

Exemplarily, the plurality of cavities H may be arranged in the array and may be formed in the first surface of the light guide plate 10. As shown in FIG. 1-4, the light guide plate 10 may further include: a plurality of reflectors 103 that are arranged on the light emitting surface of the light guide plate body 101. One-to-one correspondences may exist between the plurality of QD blocks and the plurality of reflectors 103. As an example, one QD block may have one reflector that is associated with it, and the size of the reflector may be equal or greater than the cavity that contain the QD block. In one example, both the reflector and the outside edge of the cavity that contains the QD block have substantial round shapes and may have the equal size with diameter of 250 um. As such, the reflector and QD b block may not be recognizable by human eyes.

It is to be noted that an orthographic projection of each of the plurality of reflectors 103 on the first surface of the light guide plate 10 may cover the orthographic projection of a corresponding QD block on the first surface of the light guide plate 10 and a reflecting surface of each of the plurality of reflectors may face a corresponding QD block. The reflectors may reflect the scattered light emitted by the QD blocks into the light guide plate body to continuously transmit the light in the light guide plate 10. Thus, the light may be better uniformized or homogenized, and the optical quality of the backlight may be improved.

Optionally, the plurality of reflectors may form a diffuse reflection array on the light emitting surface of the light guide plate body, and the reflecting surfaces of the reflectors may be concave surfaces. Such reflectors may increase a ratio of light that achieves total internal reflection and may thus increase the utilization rate of the light.

Figure 15:
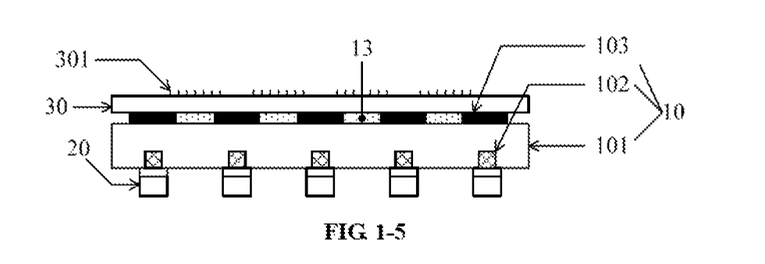
Figure 16:
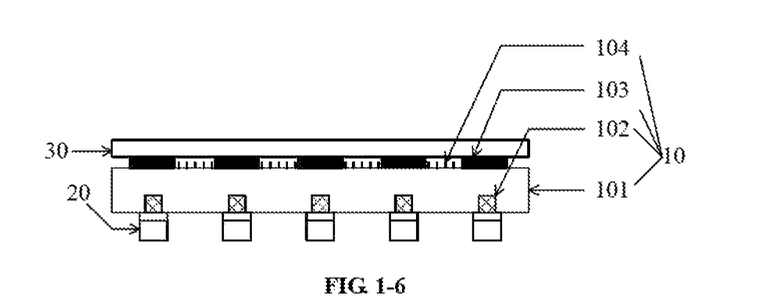
Figure 17:
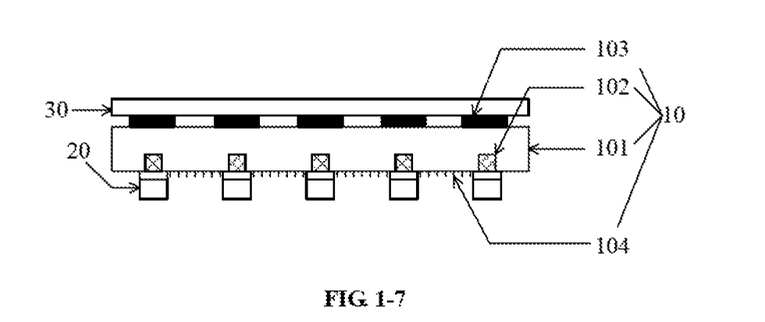

Furthermore, as shown in FIG. 1-5, 1-6 or 1-7, the backlight may further include: an optical film layer 30 that is positioned on the light emitting surface side of the light guide plate 10. The optical film layer may include a brightness enhancement film and a diffusion film.

It is to be noted that coupling structures may be adopted to regulate the emitting light of the backlight. Optionally, in the embodiment of the present disclosure, the coupling structures may form an integrated structure with the light guide plate, or may be separated from the light guide plate to form independent structures. An implementable arrangement manner for the coupling structures may include the following aspects.

On one aspect, as shown in FIG. 1-5, coupling structures 301 may be arranged on the side, which is away from the light guide plate 10, of the optical film layer 30. The gaps between the plurality of reflectors 103 in the middle of the optical film layer 30 and the light guide plate body 101 may be filled with the transparent adhesive 13.

It is to be noted that a refractive index t0 of the transparent adhesive may meet: t1≤t0≤t2, where t1 represents a refractive index of the light guide plate, and t2 represents a refractive index of the optical film layer. The transparent adhesive is filled between the optical film layer and the light guide plate body. The refractive index of the transparent adhesive is ensured to be more than or equal to the refractive index of the light guide plate and less than or equal to the refractive index of the optical film layer. In such way, the light is always transmitted from an optically thinner medium to an optically denser medium in the process of transmitting the light to the optical film via the light guide plate. Thus, a part of light may be effectively prevented from total reflection during transmission, and the utilization of the light may be increased.

On the other aspect, as shown in FIG. 1-6 or 1-7, the coupling structures form the integrated structure with the light guide plate, and the light guide plate 10 may include: coupling structures 104 that are arranged on a surface of the light guide plate body 101.

It shall be noted that: as shown in FIG. 1-6, the coupling structures 104 may be arranged on the light emitting surface of the light guide plate body 101 and between every two adjacent reflectors 103. Alternatively, as shown in FIG. 1-7, the coupling structures 104 may be arranged on the first surface of the light guide plate body 101 and the coupling structures 104 may be arranged between adjacent QD blocks 102.

Optionally, the coupling structures may have one of lattice point structures, grating structures, micro-lens structures and micro-prism structures. When the coupling structures are grating structures, grating parameters such as a grating constant, a cavity depth, a duty ratio, a grating line direction may be set to control a wavelength, direction and efficiency of light coupled from the grating structures. The three-dimensional (3D) displaying, peep-proof displaying and the like may further be implemented through the backlight.

Optionally, the embodiment of the present disclosure provides two array structures of the light emitting units, including a first array structure and a second array structure.

Figure 18:
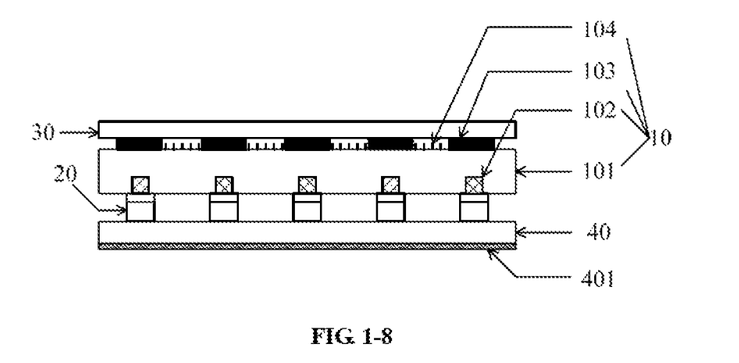

The first array structure of the light emitting units is shown in FIG. 1-8. The backlight may further include a substrate 40. The plurality of light emitting units 20 may be fixed on a surface of the substrate 40. The light emitting surfaces of the plurality of light emitting units may be attached onto the first surface of the light guide plate 10. Because, in this implementation, a shorter distance is required for light mixing, and the backlight may be thinner. In the embodiment of the present disclosure, the light emitting surfaces of the light emitting units may be attached onto the first surface of the light guide plate. Thus, the thickness of the backlight may be effectively reduced, and the lightness and thinness of the backlight can be improved.

It shall be noted that the substrate 40 may be a transparent substrate. As shown in FIG. 1-8, a reflecting layer 401 may be arranged on the other surface of the substrate. In FIG. 1-8, the other surface of the substrate is in the opposite side where the LEDs are placed. The reflecting layer 401 may reflect light escaping from the light guide plate back to the light guide plate and the utilization rate of the light can be increased.

Optionally, the reflecting layer 401 may be formed on the other surface of the substrate by coating a reflecting material such as silver or aluminium. And then, a protective layer is coated on the reflecting layer to protect the reflecting material. Alternatively, a reflecting film may be attached onto the other surface of the substrate.

Figure 19:
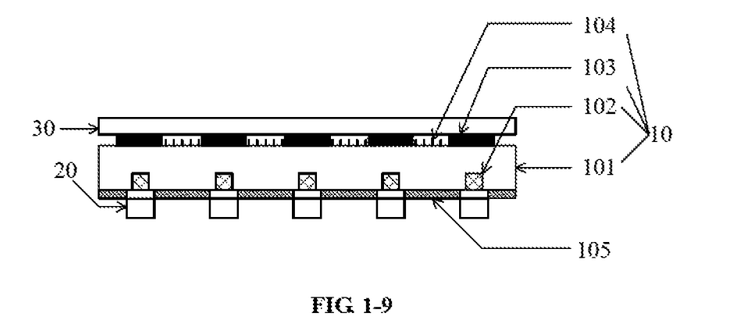

A second array structure of the light emitting units is shown in FIG. 1-9. The plurality of light emitting units 20 may be bonded onto the first surface of the light guide plate 10. The light emitting units may be micro light emitting chips, such as micro blue LEDs. The size of the micro light emitting chips are relatively smaller. The whole or part of a micro light emitting chip array may be conveniently bonded with a driving substrate. A driving circuit may be arranged on the first surface of the light guide plate, and the light guide plate may be adopted as the driving substrate. Optionally, the plurality of light emitting units may be bonded onto the first surface of the light guide plate in a welding manner. A process for such a structure is low in difficulty and is relatively lower in cost.

It is to be noted that, the driving circuit may be arranged on the first surface of the light guide plate as shown in FIG. 1-9. In this scenario, for preventing interference between the driving circuit and the coupling structures, the coupling structures are usually not arranged on the first surface of the light guide plate. For example, the coupling structures 104 may alternatively be arranged on an emitting side of the optical film layer as shown in FIG. 1-9.

Furthermore, as shown in FIG. 1-9, a reflecting layer 105 may be arranged to place in an area other than the area where the light emitting units 20 are placed on the first surface of the light guide plate 10. The reflecting layer may reflect light received on the first surface of the light guide plate back to the light guide plate. The utilization rate of the light can thus be increased.

Optionally, the reflecting layer may be formed on the first surface of the light guide plate in the manner of coating the reflecting material such as silver or aluminium. The micro light emitting chips may be bonded onto the first surface of the light guide plate. The reflecting layer may be arranged to place in the area other than the area where the light emitting units are positioned on the first surface of the light guide plate. Because no substrate is required, the thickness of the backlight may further be reduced.

According to the backlight provided by the embodiment of the present disclosure, the light emitting units arranged in the array may be controlled by an independent control unit as to whether to emit light or not. The area light control may thus be achieved.

In an implementation, the light emitting units may be LEDs. Optionally, the light emitting units in the embodiment of the present disclosure may be blue LEDs. For example, the light emitting units may be micro blue LEDs. The blue LEDs may effectively trigger the QD layer to emit light in the scattering manner.

It is to be noted that the QD layer may be made from a QD material which may include a base material, a ligand material and scattering particles. The base material may include polyetherimide (PEI) and ammonium persulfate (APS). The ligand material may include an epoxy resin. The scattering particles may include silicon dioxide particles. The base material and the ligand material may mitigate the impact on QDs from an environment of high temperature, high-intensity light, water and oxygen. The scattering particles may facilitate the light emitted by the QDs to scatter around. Optionally, the QDs may be cadmium selenide QDs.

Figure 110:
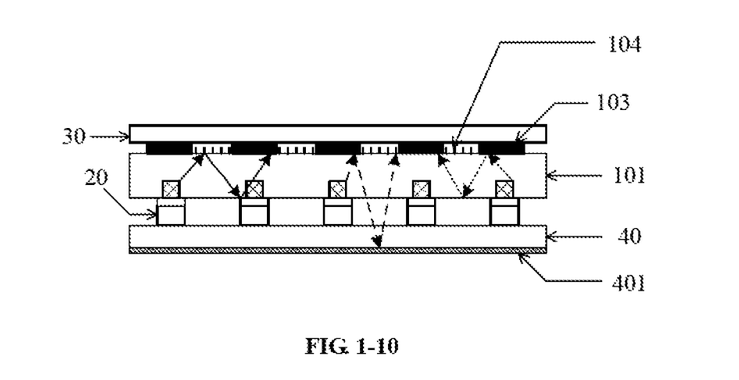

Exemplarily, FIG. 1-10 is a schematic diagram of light transmission of a backlight shown in FIG. 1-8. As shown in FIG. 1-10, when the light emitted by the light emitting units 20 triggers the QD blocks to emit light, a part of light in the scattered light emitted by the QDs is transmitted to a far end in the light guide plate body 101, the other part of light is reflected by the reflectors 103. A part of light in the light reflected by the reflectors 103 is transmitted to the far end in the light guide plate body 101, the other part of light may be reflected by the reflecting layer 401 back into the light guide plate for transmission after escaping from the light guide plate. The light transmitted to the far end may be regulated through the coupling structures 104. Such a backlight may well uniformize the light, and may also effectively increase the utilization rate of the light.

From the above, according to the backlight provided by the embodiment of the present disclosure, the backlight is the direct type backlight, and includes the light guide plate and the plurality of light emitting units arranged on the first surface of the light guide plate. The QD layer is arranged on the light guide plate, and the QD layer may be triggered by the light emitting units to emit the light in the scattering manner to achieve the light uniformization effect.

Therefore, compared with other implementations, the light emitting sides of the light emitting units are not required to be formed a certain distance from the first surface of the light guide plate for mixing light. For example, the light emitting units may be attached onto the first surface of the light guide plate. As a result, the whole structure of the backlight may be prevented from being limited by the distance between the light emitting units and the light guide plate for achieving the light uniformization. The ability to flexibly adjust the backlight is improved, and attachment arrangement of the light emitting surfaces of the light emitting units and the first surface of the light guide plate also improves the lightness and thinness of the backlight.

Figure 21:
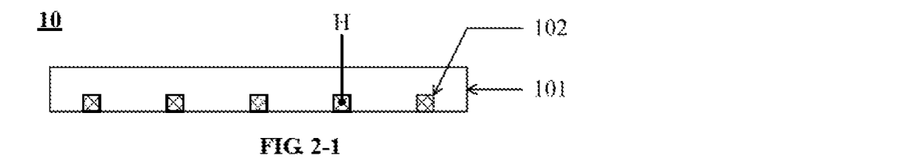

As shown in FIG. 2-1, an embodiment of the present disclosure provides a light guide plate 10. The light guide plate 10 may include: a light guide plate body 101 and a plurality of QD blocks 102 arranged on the light guide plate body 101. A plurality of cavities H are formed in a surface of the light guide plate body 101, and a QD block is arranged in each of the plurality of cavities.

It is to be noted that the plurality of cavities H are formed in a surface of the light guide plate body 101 in an array. Optionally, the plurality of cavities H arranged in the array may be formed in a first surface of the light guide plate 10, or in a light emitting surface of the light guide plate 10.

From the above, according to the light guide plate provided by the embodiment of the present disclosure, the cavities are formed in a surface of the light guide plate body, a QD block may be arranged in each of the plurality of cavities. The light may trigger the QD blocks to emit light in a scattering manner after entering the light guide plate, and a light uniformization effect of the light guide plate may be improved comparing with other implementations.

Figure 22:
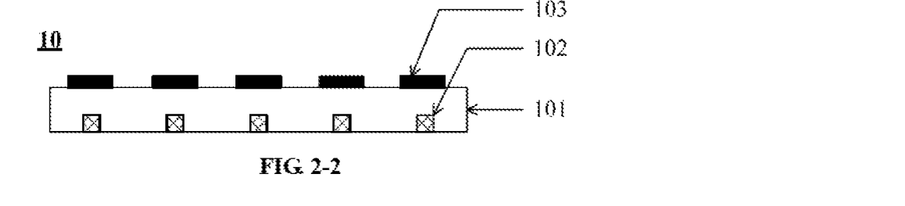

Optionally, as shown in FIG. 2-2, the light guide plate 10 may further include: a plurality of reflectors 103 arranged on the light emitting surface of the light guide plate body 101. There may be one-to-one correspondences between each of the plurality of QD blocks 102 and each of the plurality of reflectors 103.

It is to be noted that an orthographic projection of each of the plurality of reflectors 103 on the first surface of the light guide plate 10 may cover an orthographic projection of a corresponding QD block on the first surface of the light guide plate. A reflecting surface of each of the plurality of reflectors may face and may be associated with a corresponding QD block. The reflectors may reflect the scattered light emitted by the QD blocks into the light guide plate body to continue transmitting the light in the light guide plate. Thus, the light uniformization effect of the light guide plate may be improved, and optical quality of a backlight may further be improved.

Optionally, the plurality of reflectors may form a diffuse reflection array on the light emitting surface of the light guide plate body. The reflecting surfaces of the reflectors may be concave surfaces so that the reflectors may increase a ratio of light to generate the total internal reflection and may increase the utilization rate of the light.

Figure 23:
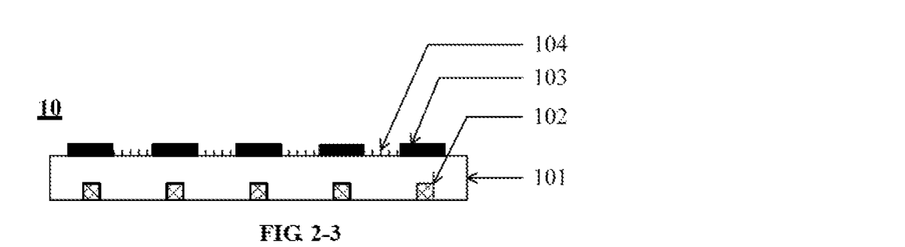
Figure 24:
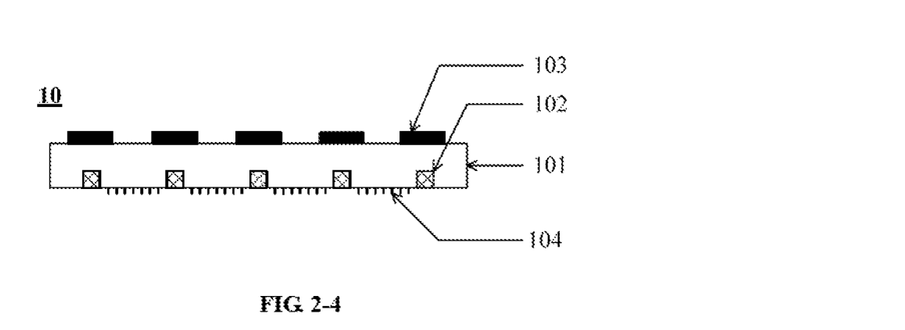

Furthermore, as shown in FIG. 2-3 or 2-4, the light guide plate 10 may further include: grating structures 104 that may be arranged on a surface of the light guide plate body 101. As shown in FIG. 2-3, the grating structures 104 may be arranged on the light emitting surface of the light guide plate body 101 and the grating structures 104 may be arranged between adjacent reflectors 103. As shown in FIG. 2-4, the grating structures 104 may alternatively be arranged on the first surface of the light guide plate 101 and the grating structures 104 may be arranged between adjacent QD blocks 102.

Grating parameters such as a grating constant, a cavity depth, a duty ratio and a grating line direction may be set to control a wavelength, direction and efficiency of light coupled from the grating structures. Further, the 3D displaying, peep-proof displaying and the like may further be implemented through the backlight.

Optionally, the grating structures may belong to coupling structures, and may be used for regulating emitting light of the backlight. The coupling structures arranged on a surface of the light guide plate body may further include: lattice point structures, micro-lens structures or micro-prism structures.

It is to be noted that the QD blocks are made from the QD material which may include a base material, a ligand material and scattering particles. The base material may include PEI and APS. The ligand material may include an epoxy resin. The scattering particles may include silicon dioxide particles. The base material and the ligand material may reduce the impact on QDs due to of an environment of high temperature, high-intensity light, water, oxygen and the light. The scattering particles may facilitate the light emitted by the QDs to scatter around. Optionally, the QDs may be cadmium selenide QDs.

Figure 25:
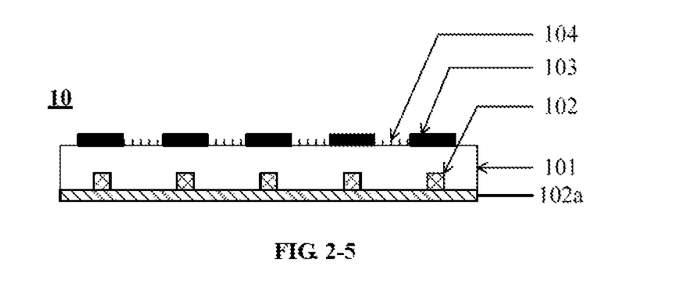
Figure 26:
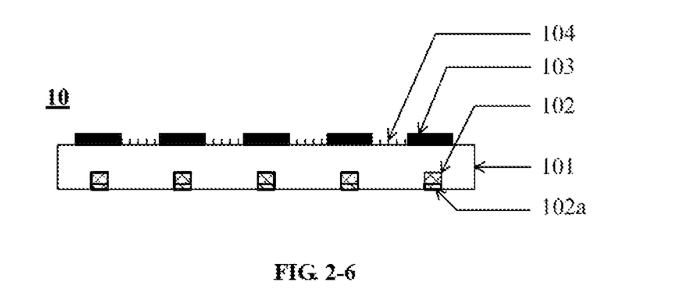

Furthermore, as shown in FIG. 2-5, a packaging adhesive 102a may be arranged on the plurality of QD blocks 102. Optionally, as shown in FIG. 2-5, a packaging adhesive layer 102a may be arranged on the whole surface, in which the cavities H are formed, of the light guide plate body 101. Alternatively, as shown in FIG. 2-6, a layer of packaging adhesive 102a may merely be coated on the surfaces of the QD blocks in the cavities.

In the light guide plate shown in FIG. 2-4, the grating structures 104 may be arranged on the first surface of the light guide plate body 101. FIG. 2-4 is provided for exemplary description and is not intended to limit specific positions of the grating structures. The packaging adhesive is arranged on the QD blocks so that a good sealing effect on the QD blocks in the cavities may be achieved. The service life of the light guide plate may also be increased.

Optionally, a light guide plate structure provided by the embodiment of the present disclosure may refer to a light guide plate structure in a backlight in the abovementioned embodiment of the present disclosure, and will not be elaborated in the embodiment of the present disclosure.

From the above, according to the light guide plate provided by the embodiment of the present disclosure, the cavities are formed in a surface of the light guide plate body, a QD block is arranged in each of the plurality of cavities, and the light may emitted from LEDs may trigger the QD blocks to emit the light in the scattering manner after entering the light guide plate so that the light uniformization effect of the light guide plate may be improved.

Figure 31:
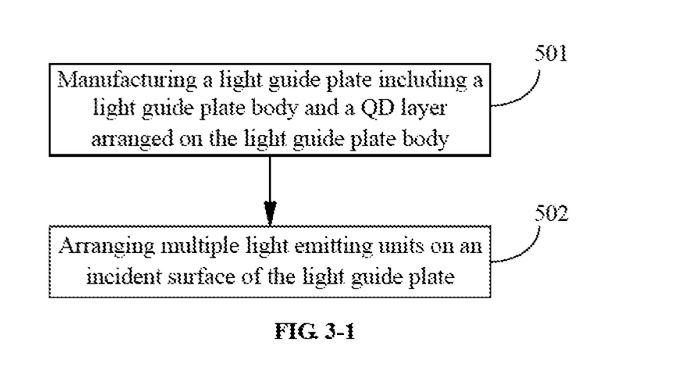

An embodiment of the present disclosure provides a method for manufacturing a backlight. The backlight is a direct type backlight. As shown in FIG. 3-1, the method may include the following steps.

In a step 501, a light guide plate is manufactured where the light guide plate may include a light guide plate body and a QD layer that is arranged on the light guide plate body.

In a step 502, a plurality of light emitting units are arranged on a first surface of the light guide plate.

The light emitted by the plurality of light emitting units is capable of illuminating the QD layer to cause the QD layer to emit light.

From the above, according to the method for manufacturing the backlight provided by the embodiment of the present disclosure, the backlight is the direct type backlight, and includes the light guide plate and the plurality of light emitting units arranged on the first surface of the light guide plate. The QD layer is arranged on the light guide plate, and may be excited by the light emitted from the light emitting units to emit light in a scattering manner to achieve a light uniformization effect.

Therefore, compared with the other implementations, light emitting sides of the light emitting units are not required to allow a certain distance from the first surface of the light guide plate for mixing light. For example, the light emitting units may be attached onto the first surface of the light guide plate. As a result, the structure of the backlight may be prevented from being limited by the distance between the light emitting units and the light guide plate for achieving light uniformization. The flexibility of regulation of the backlight is improved.

Figure 32:
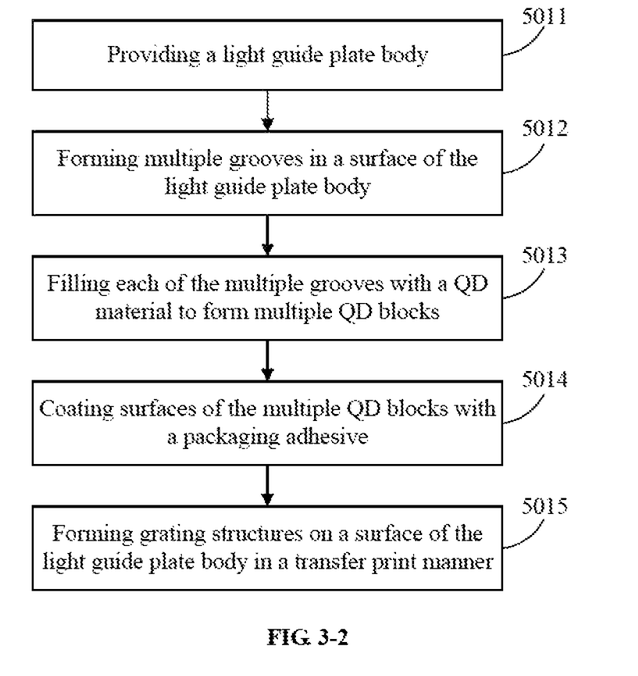

Optionally, as shown in FIG. 3-2, a method for manufacturing the light guide plate may include the following steps.

In a step 5011, the light guide plate body is provided.

Optionally, a material of the light guide plate body may be an organic material or glass. Other materials may also be used and the present disclosure does not intend to limit the use of materials.

In a step 5012, a plurality of cavities are formed in a surface of the light guide plate body.

It is to be noted that the plurality of cavities H may be arranged in a surface of the light guide plate body 101 in an array. Optionally, as shown in FIG. 1-2, the plurality of cavities H arranged in the array may be formed in the first surface of the light guide plate 10. As shown in FIG. 1-3, the plurality of cavities H formed in the array may alternatively be formed in a light emitting surface of the light guide plate 10.

Optionally, various implementations may be adopted for forming the plurality of cavities in a surface of the light guide plate body. Exemplarily, the plurality of cavities may be formed in a surface of the light guide plate body in a laser irradiation manner.

Optionally, the plurality of cavities may be formed in a surface of the light guide plate body by a one-time pattern construction process. The process may include the following steps.

In a step S1, a mask pattern is formed on the light guide plate body. The mask pattern includes a plurality of hollow areas.

Exemplarily, a photoresist layer may be coated on the light guide plate body, and then the photoresist is exposed and is developed to obtain the mask pattern.

In a step S2, the light guide plate body formed with the mask pattern is etched to form one cavity in each of hollow areas in the light guide plate body.

In a step S3, the mask pattern is stripped.

Optionally, the cavities may be formed in the light guide plate body by adopting a wet etching process or a mechanical perforating method. A manner for forming the plurality of cavities in a surface of the light guide plate body may have many variations. The present disclosure does not intend to limit to any specific manner.

In a step 5013, each of the plurality of cavities is filled with the QD material to form a plurality of QD blocks.

Optionally, a method for filling each of the plurality of cavities with the QD material to form the plurality of QD blocks may include:

Filling each of the plurality of cavities with the QD material; and performing heat curing treatment on the QD material to form the plurality of QD blocks. The QD material may include a base material, a ligand material and scattering particles. The base material may include PEI and APS. The ligand material may include an epoxy resin. The scattering particles may include silicon dioxide particles. The base material and the ligand material may reduce the impact on QDs due to an environment of high temperature, high-intensity light, water, oxygen and the light. The scattering particles may facilitate the light emitted by the QDs to scatter around. Optionally, the QDs may be cadmium selenide QDs.

It is to be noted that temperature during heat curing treatment of the QD material should be lower than 200 DEG C. to avoid influence on light emitting performance of the QDs at high temperature and to avoid incapability in achievement of a curing effect on the QD material at low temperature. Optionally, the heating temperature for heat curing treatment may be 100 DEG C.

In a step 5014, a packaging adhesive is coated on surfaces of the plurality of QD blocks.

Optionally, in FIG. 2-5, an integrated packaging adhesive layer may be arranged on the surface, in which the cavities H are formed, of the light guide plate body 101. Alternatively, as shown in FIG. 2-6, a layer of packaging adhesive is coated on the surfaces of the QD blocks in the cavities. The packaging adhesive may be arranged on the QD blocks so that a good sealing effect on the QD blocks in the cavities may be achieved. The service life of the light guide plate may be prolonged. The present disclosure does not intend to limit the implementation of packaging adhesive.

In the light guide plate shown in FIG. 2-6, grating structures 104 may also be arranged on the light-emitting surface of the light guide plate body 101. FIG. 2-6 is provided for exemplary description and the present disclosure does not intend to limit specific positions of the grating structures.

In a step 5015, grating structures are formed on a surface of the light guide plate body in a transfer print manner.

Optionally, the grating structures may be formed on a surface of the light guide plate body in a nanoimprint manner.

It is to be noted that the grating structures may belong to coupling structures, and may be used for regulating emitting light of the backlight. The coupling structures arranged on a surface of the light guide plate body may further include: lattice point structures, micro-lens structures or micro-prism structures. The present disclosure does not intend to limit the implementations of coupling structures.

It is to be noted that a sequence of the steps of the method for manufacturing the backlight provided by the embodiment of the present disclosure may be properly regulated, the steps may also be correspondingly added and reduced according to a condition, and any method apparent to those skilled in the art within the technical scope disclosed by the present disclosure shall fall within the scope of protection of the present disclosure, and thus will not be elaborated.

From the above, the method for manufacturing the backlight provided by the embodiment of the present disclosure is applied to the direct type backlight, the backlight may include the light guide plate and the plurality of light emitting units arranged on the first surface of the light guide plate. The QD layer is arranged on the light guide plate, and may be excited or triggered by the light emitted from the light emitting units to emit light in the scattering manner to achieve the light uniformization effect.

Therefore, compared with other implementations, the light emitting sides of the light emitting units are not required to be formed with a certain distance from the first surface of the light guide plate for light mixing. For example, the light emitting units may be attached onto the first surface of the light guide plate. As a result, the structure of the backlight may be prevented from being limited by the distance between the light emitting units and the light guide plate for achieving light uniformization. The flexibility to regulate the backlight is improved. The attachment arrangement of the light emitting surfaces of the light emitting units and the first surface of the light guide plate also improves lightness and thinness of the backlight.

Figure 4:
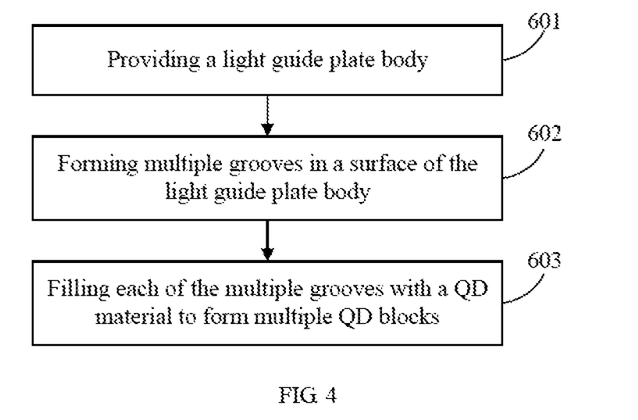
FIG. 4 is a flowchart of a method for manufacturing a light guide plate according to another embodiment of the present disclosure.

An embodiment of the present disclosure provides a method for manufacturing a light guide plate. As shown in FIG. 4, the method may include the following steps.

In a step 601, providing a main body of plate shape.

In a step 602, forming a plurality of cavities in a surface of the light guide plate body.

In a step 603, filling each of the plurality of cavities with the QD material to form a plurality of QD blocks.

From the above, according to the method for manufacturing the light guide plate provided by the embodiment of the present disclosure, the cavities are formed in a surface of the light guide plate body, a QD block is arranged in each of the plurality of cavities, and light may excite the QD blocks to emit light in a scattering manner after entering the light guide plate. A light uniformization effect of the light guide plate may be improved.

Optionally, specific contents of the method for manufacturing the light guide plate provided by the embodiment of the present disclosure may refer to the method for manufacturing the light guide plate in the abovementioned embodiment of the method for manufacturing the backlight such as Step 5011 to Step 5015, and are not elaborated in the embodiment of the present disclosure.

It is to be noted that a sequence of the steps of the method for manufacturing the light guide plate provided by the embodiment of the present disclosure may be properly regulated, the steps may also be correspondingly added and reduced according to a condition, and any method apparent to those skilled in the art within the technical scope disclosed by the present disclosure shall fall within the scope of protection of the present disclosure, and thus will not be elaborated.

An embodiment of the present disclosure provides a display device, which may include: any backlight shown in FIG. 1-1 to FIG. 1-9.

During specific implementation, the display device provided by the embodiment of the present disclosure may be any product or part with a displaying function such as a mobile phone, a tablet computer, a television, a display, a notebook computer, a digital photo frame and a navigator.

From the above, the display device provided by the embodiment of the present disclosure includes a direct type backlight, the direct type backlight includes a light guide plate and a plurality of light emitting units arranged on a first surface of the light guide plate. A QD layer is arranged on the light guide plate, and the QD layer may be excited or triggered by light emitted from the light emitting units to emit light in a scattering manner to achieve a light uniformization effect.

Therefore, compared with other implementations, light emitting sides of the light emitting units are not required to be formed with a certain distance from the first surface of the light guide plate for light mixing. For example, they may be attached onto the first surface of the light guide plate. As a result, the whole structure of the backlight may be prevented from being limited by the distance between the light emitting units and the light guide plate for the sake of light uniformization. The flexibility to regulate the backlight is improved.

The above embodiments are only the optional embodiments of the present disclosure and not intended to limit the present disclosure. Any modifications, equivalent alternatives, improvements and the like made within the spirit and principle of the present disclosure shall fall within the scope of protection of the present disclosure.

What is claimed is:

1. A backlight of a direct type, comprising:
    a light guide plate having a main body of a plate shape;
    a plurality of light emitting units that are placed toward to a plane side of the light guide plate;
    wherein the light guide plate comprises a Quantum Dot (QD) layer on a first surface of the main body wherein the first surface is substantially flat;
    the QD layer comprises a plurality of QD blocks, an orthographic projection of a respective one of the plurality of QD blocks on the first surface is overlapped with an orthographic projection of at least one of the plurality of light emitting units on the first surface;
    the light guide plate further comprises a plurality of reflectors on a second surface of the main body having a one-to-one relationship with the plurality of QD blocks, wherein the second surface is substantially flat, and
    an orthographic projection of a respective one of the plurality of reflectors on the first surface covers an orthographic projection of a corresponding QD block on the first surface, and a reflecting surface of the respective one of the plurality of reflectors faces a corresponding QD block.

2. The backlight according to claim 1, wherein the light guide plate comprises a plurality of cavities, and the plurality of QD blocks being respectively in the plurality of cavities.

3. The backlight according to claim 1, further comprising:
    an optical film layer on a side of the light guide plate that is placed away from the plurality of light emitting units; and
    coupling structures on a side of the optical film layer that are away from the light guide plate;
    a transparent adhesive layer between the optical film layer and the light guide plate; and
    a refractive index t0 of the transparent adhesive layer is larger than a refractive index t1 of the light guide plate, and smaller than a second refractive index t2 of the optical film layer.

4. The backlight according to claim 1, wherein the light guide plate further comprises:
    coupling structures arranged on one of the first surface and the second surface.

5. The backlight according to claim 3, wherein the coupling structures are lattice point structures, grating structures, micro-lens structures or micro-prism structures.

6. The backlight according to claim 1, further comprising a substrate, wherein
    the plurality of light emitting units are fixed on a surface of the substrate, and wherein a respective one of the plurality of light emitting units has a light emitting surface that is attached onto the first surface of the light guide plate.

7. The backlight according to claim 6, wherein the substrate is a transparent substrate, and a reflecting layer is arranged on a second surface of the substrate.

8. The backlight according to claim 1, wherein the light emitting units are micro light emitting chips, and the plurality of light emitting units are bonded onto the first surface of the main body.

9. The backlight according to claim 8, further comprising:
    a reflecting layer covering the first surface except where the light emitting units are positioned.

10. The backlight according to claim 1, wherein the light emitting units are blue Light-Emitting Diodes (LEDs).

11. The backlight according to claim 1, wherein
    the plurality of QD blocks are made from a QD material which comprises a base material, a ligand material and scattering particles; and
    the base material comprises Polyetherimide (PEI) and Ammonium Persulfate (APS), the ligand material comprises an epoxy resin, and the scattering particles comprise silicon dioxide particles.

12. A display device, comprising:
    the backlight according to claim 1.

13. A light guide plate, comprising:
    a main body of plate shape,
    a plurality of cavities on a first surface of the main body, and
    a plurality of Quantum Dot (QD) blocks on the main body,
    wherein a respective one of the plurality of cavities contains one of the plurality of QD blocks;
    the QD blocks are made from a QD material which comprises a base material, a ligand material and scattering particles; and
    the base material comprises Polyetherimide (PEI) and Ammonium Persulfate (APS), the ligand material comprises an epoxy resin, and the scattering particles comprise silicon dioxide particles.

14. The light guide plate according to claim 13, further comprising:
    a plurality of reflectors arranged on a light emitting surface of the main body, wherein and a one-to-one correspondence exists between the plurality of QD blocks and the plurality of reflectors, an orthographic projection of a respective one of the plurality of reflectors on the first surface of the light guide plate covers an orthographic projection of a corresponding QD block on the first surface of the light guide plate, and a reflecting surface of the respective one of the plurality of reflectors faces a corresponding QD block.

15. The light guide plate according to claim 14, further comprising:

grating structures arranged on one of the plurality of surfaces of the main body.

16. The light guide plate according to claim 13, further comprising:

a packaging adhesive layer on the plurality of QD blocks.

17. A method for manufacturing a backlight, comprising:

forming a light guide plate having a main body of plate shape; and forming a plurality of light emitting units toward to a plane side of the light guide plate;

wherein forming the light guide plate comprises forming a Quantum Dot (QD) layer on a first surface of the main body wherein the first surface is substantially flat, and forming a plurality of reflectors on a second surface of the main body wherein the second surface is substantially flat;

the QD layer is formed to comprise a plurality of QD blocks;

an orthographic projection of a respective one of the plurality of QD blocks on the first surface is overlapped with an orthographic projection of at least one of the plurality of light emitting units on the first surface;

the plurality of reflectors are formed to have a one-to-one relationship with the plurality of QD blocks;

an orthographic projection of a respective one of the plurality of reflectors on the first surface covers an orthographic projection of a corresponding QD block on the first surface, and a reflecting surface of the respective one of the plurality of reflectors faces a corresponding QD block.

* * * * *